United States Patent
Fornos Martinez et al.

(10) Patent No.: US 12,005,650 B2
(45) Date of Patent: Jun. 11, 2024

(54) 3D PRINTER TO PRINT OBJECTS AND A SHIELD

(71) Applicant: HEWLETT-PACKARD DEVELOPMENT COMPANY, L.P., Spring, TX (US)

(72) Inventors: Pol Fornos Martinez, Sant Cugat del Valles (ES); Maria de las Mercedes Blanco Rollan, Sant Cugat del Valles (ES); Ismael Fernandez Aymerich, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 291 days.

(21) Appl. No.: 17/285,056

(22) PCT Filed: Apr. 26, 2019

(86) PCT No.: PCT/US2019/029399
§ 371 (c)(1),
(2) Date: Apr. 13, 2021

(87) PCT Pub. No.: WO2020/219074
PCT Pub. Date: Oct. 29, 2020

(65) Prior Publication Data
US 2022/0001626 A1   Jan. 6, 2022

(51) Int. Cl.
*B29C 64/40*   (2017.01)
*B22F 10/20*   (2021.01)
(Continued)

(52) U.S. Cl.
CPC .............. *B29C 64/40* (2017.08); *B22F 10/20* (2021.01); *B22F 10/28* (2021.01); *B22F 10/368* (2021.01);
(Continued)

(58) Field of Classification Search
CPC ..... B29C 64/40; B29C 64/364; B29C 64/393; B22F 10/20; B22F 10/47; B22F 10/28;
(Continued)

(56) References Cited

U.S. PATENT DOCUMENTS 6,451,152 B1   9/2002   Holmes et al.
7,521,652 B2   4/2009   Chung et al.
(Continued)

FOREIGN PATENT DOCUMENTS

EP   3181271 A1   6/2017

*Primary Examiner* — Mohammad Ali
*Assistant Examiner* — Joshua T Sanders
(74) *Attorney, Agent, or Firm* — Michael Dryja

(57) ABSTRACT

An apparatus comprises a processor and a machine-readable storage medium storing machine-readable instructions executable by the processor. The machine-readable instructions comprise instructions to cause the processor to create 3D print data including data defining one or more objects to be printed in a build chamber of a 3D printer and data defining, in addition to the one or more objects, a shield to be printed to shield the one or more printed objects in the build chamber to reduce heat dissipation to an outside of the build chamber. The shield is designed depending on a thermal behavior of the build chamber and/or depending on a thermal behavior of the one or more objects to be printed.

18 Claims, 9 Drawing Sheets

(51) Int. Cl.
*B22F 10/28* (2021.01)
*B22F 10/368* (2021.01)
*B22F 10/47* (2021.01)
*B22F 12/90* (2021.01)
*B29C 64/364* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC ............ *B22F 10/47* (2021.01); *B29C 64/364* (2017.08); *B29C 64/393* (2017.08); *B22F 12/90* (2021.01); *B33Y 10/00* (2014.12); *B33Y 30/00* (2014.12); *B33Y 50/02* (2014.12)

(58) Field of Classification Search
CPC ........ B22F 10/368; B22F 12/90; B33Y 10/00; B33Y 30/00; B33Y 40/00; B33Y 50/02
USPC .......................................................... 700/119
See application file for complete search history.

(56) References Cited

U.S. PATENT DOCUMENTS

| | | | |
|---|---|---|---|
| 7,604,768 B2 | 10/2009 | Kritchman | |
| 9,254,535 B2 | 2/2016 | Buller et al. | |
| 2008/0124475 A1* | 5/2008 | Kritchman | B29C 48/92 427/421.1 |
| 2013/0113868 A1* | 5/2013 | Veis | C09D 11/101 347/102 |
| 2013/0182021 A1* | 7/2013 | Vilk | B41J 2/2132 347/5 |
| 2015/0048075 A1* | 2/2015 | Pedrosa | B05D 3/0209 219/410 |
| 2015/0054204 A1* | 2/2015 | Tseliakhovich | B29C 64/264 425/162 |
| 2016/0096326 A1 | 4/2016 | Naware | |
| 2017/0129052 A1 | 5/2017 | Buller et al. | |
| 2018/0221953 A1 | 8/2018 | Ng et al. | |
| 2018/0345649 A1 | 12/2018 | Prakash | |
| 2018/0361667 A1 | 12/2018 | Sternå et al. | |
| 2019/0150319 A1* | 5/2019 | Leigh | H01L 23/467 361/690 |

* cited by examiner

3D PRINTER TO PRINT OBJECTS AND A SHIELD

BACKGROUND

Dimensional accuracy is crucial for 3D printing applications of 3D printers. Materials used for printing 3D objects may suffer contractions or expansions during a build process including a fusing process and a cooling process. To have dimensional repeatability materials having a similar cooling rate may be used for the build process.

BRIEF DESCRIPTION OF THE DRAWINGS

Examples will now be described, by way of non-limiting examples, with reference to the accompanying drawings, in which.

DETAILED DESCRIPTION

Figure 1:
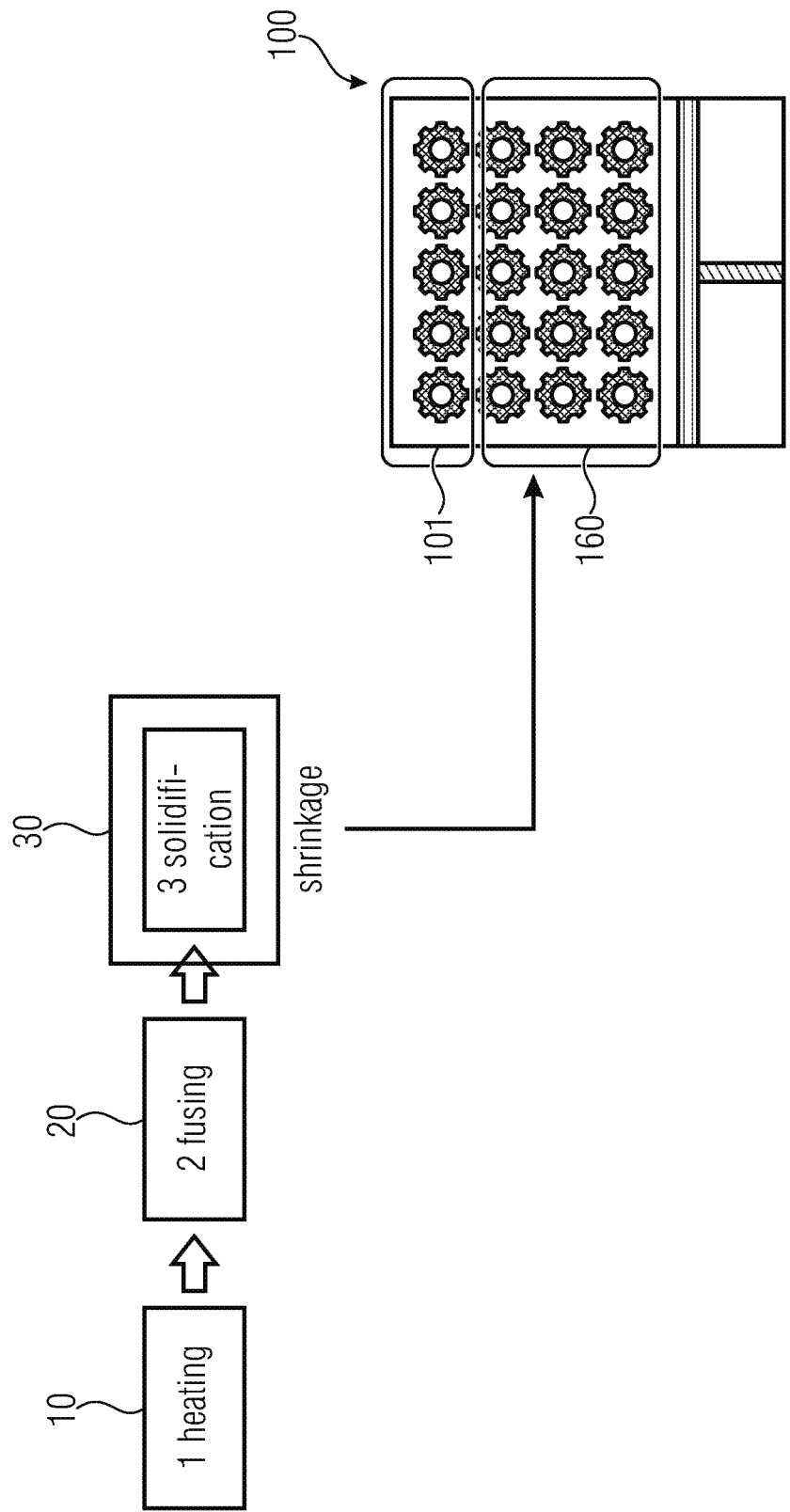
FIG. 1 is a schematic illustration representing different stages to print a 3D object according to an example.

The dimensional accuracy of one or more 3D objects to be printed in a build chamber of a 3D printer may vary. For example, depending on a position in the build chamber where a 3D object is or plural objects are printed, portions of a 3D object or a 3D object may have a different cooling rate, which may lead to different contractions which in turn may result in a failed accuracy of the printed object or objects. The cooling rate determines how quick a printed object reaches room temperature after being fused or melted. Portions of printed 3D objects are surrounded by unsintered powder which is hot. The cooling rate of these portions may depend on the temperature of the hot powder. Also, due to a construction of the build chamber an object to be printed may suffer a varying expansion during the build process depending on the position where the object is printed inside the build chamber. The term construction of the build chamber refers to a physical structure of the build chamber. For example, sidewalls of the build chamber may have a different thickness than a base wall of the build chamber or the build chamber may have a taper geometry. A possible position where a different cooling rate may be is for example a top or the base or positions at the sidewalls of a print volume in the build chamber. At the top, for example, heat may dissipate faster compared to a position, for example, close to a base. All this may led to thermal non-uniformities across the build chamber of the 3D printer. In examples, the build material includes short fibres that may have been cut into short lengths from long strands or threads of material. The build material may include plastics, ceramic, and metal powders and powdery materials. In examples, the 3D printer may use chemical binder systems or may use metal type 3D printing. The present disclosure is not limited to the specified 3D printing systems disclosed herein.

To handle thermal non-uniformities across the build chamber of the 3D printer a shield to shield the one or more printed objects may be printed during a build process of the one or more objects which are to be printed. Printing a shield may reduce heat dissipation to an outside of the build chamber. Stated differently, by printing the shield different regions of the build chamber may have cooling rates which converge to each other. Converge means that the different cooling rates become similar. Due to the converged cooling rates the amount of expansion and contractions the printed objects suffer during the built process may be unified. The converged cooling rates may improve the dimensional accuracy of the printed objects.

Examples of the present disclosure relate to an approach which permits printing one or more objects to be printed and a shield to shield the printed one or more objects in the build chamber of a 3D printer to reduce heat dissipation to an outside of the build chamber, for example to correct for the effects of thermal non-uniformities in the build chamber of a 3D printing machine, in an effective manner. The approach permits to print the one or more objects to be printed and to print the shield during the same build process. Stated differently, the one or more objects and the shield may be printed simultaneously. The approach permits to model the shield depending on thermal losses of the build chamber, wherein the thermal losses may arise due to the physical structure of the build chamber and/or may arise due to thermal losses because of the particular geometry of an object to be printed. The thermal behavior may depend on different cooling rates in the build chamber. The different cooling rates may arise due to thermal losses of the build chamber and/or due to the particular geometry of the one or more objects to be printed and/or due to a position in the build chamber where an object is printed. The thermal behavior may be measured using, for example, a temperature camera inside the 3D printer. For example, the thermal camera may be attached to a print head. The thermal camera may measure a temperature distribution in the build chamber before and/or during and/or after the build process. In this way, for example, the thermal behavior may be determined depending on the build chamber and/or the object geometry and/or on the position as described. The thermal behavior may be measured continuously as a function of time or stationary at one or more points in time, e.g. before and/or during and/or after the build process. Other devices allowing to determine the thermal behavior may also be considered. The present disclosure is not limited to a temperature camera. In examples, 3D print data are created including data defining the one or more objects to be printed and data defining the shield to be printed to shield the printed one or more objects printed in the build chamber, wherein the shield is printed under the same conditions as the one or more objects. The shield is designed depending on a thermal behavior of the build chamber and/or depending on a thermal behavior of the one or more objects to be printed. Depending on the heat dissipation inside the build chamber and/or at the sides of the build chamber a printed object may cool down after printing with a cooling rate which may be dependent on the positions in the build chamber where the one or more objects are printed and which may be dependent on the geometry of the printed object. In examples, the 3D printer may comprise an apparatus or may be communicatively coupled via an interface with the apparatus. The apparatus may create the data defining the objects to be printed. Also the apparatus may include machine readable instructions which may cause a processor to design the shield due to the data defining the objects to be printed and/or due to thermal losses of the build chamber.

The term one or more objects means one 3D object or more 3D objects which is or are to be printed to produce a specific object or product in response to a user submission. The term shield means a shield or a cover which is to shield or to cover the printed 3D objects in the build chamber to reduce heat dissipation to an outside of the build chamber at one or more sides of the build chamber. The term build chamber means that the objects are printed in the build chamber of the 3D printing system comprising the 3D printer. The build chamber has several sides which may be sidewalls or open sides. For example one sidewall may be a base wall, other sides may be sidewalls and another side may be a top wall. For example each of the sidewalls may be built from the same solid material or from different solid materials. The term solid material refers to building the build chamber as such, wherein the term build material used herein refers to print the one or more objects in the build chamber. For example, each sidewall may have a sidewall thickness which may be different for each sidewall. The sidewall thickness may have a thermal conductivity such that the heat dissipation inside the build chamber may vary depending on an area or region where an object is printed.

3D printing systems or 3D printers may print objects, such as 3D objects and an additional shield or additional shields, by applying fusing agents, e.g. fluids, to layers of build material and applying heat in order to fuse the build material at locations where the fusing agent is placed. The build material may include powder. In examples, the build material includes, or may be formed from, short fibres that may have been cut into short lengths from long strands or threads of material. The build material may include plastics, ceramics, or metals and/or plastic powders, ceramic powders, or metal powders and powdery materials. In examples, the 3D printer may use chemical binder systems or may use metal type 3D printing. The present disclosure is not limited to the specified 3D printing systems disclosed herein.

While a printed object is cooled, it may undergo a geometrical transformation which may depend on how the temperature of the objects varies and/or may depend on the build materials used for printing the objects or products. For example, the temperature of the objects may vary because of their geometry or because of thermal losses to an outside of the build chamber.

Referring now to FIG. 1, there is shown a simplified illustration of a build process of a 3D printing system 100 according to an example. Additive manufacturing techniques may use powdery materials such as plastic. The powder is deposited layer by layer in a build chamber and the 3D objects are obtained by using fusing and applying fusing agents including a liquid and/or energy. The fusing agent may be, for example, a liquid or energy applied to the powder or a combination of a liquid and applied energy applied to the powder. The fusing agent is applied in positions in the build chamber where a 3D object is to be formed. Stated differently, by applying the fusing agent to a layer of powder at certain positions, the fusing process may be initiated to build a layer of the one or more 3D objects.

When the powder is layer by layer deposited in the build chamber and the fusing is performed layer by layer, the one or more 3D objects may have a particular geometry after performing the build process. During the build process 3D printing materials go through different stages until a 3D object is build. These different stages comprise heating solid powder to reach a fusing temperature of the powder at 10, fusing to transform the powder from solid to liquid at 20 and solidification to transform the liquid to solid at 30. The transformation of fusing at 20 may be performed using one fusing agent or more fusing agents such as fluids and/or energy applied allowing the used materials to exceed the fusing temperature. Finally the solidification at 30 takes place to transform from liquid to solid. In all these three processes, i. e. heating, fusing and solidification, thermal contractions or expansions may take place inside a 3D printing system 100, especially on top 101 of a build chamber 160. In particular, during solidification after fusing a shrinkage may take place. For some build materials this change in volume may be more or less stable and vary depending on the cooling rate or cooling rates, e.g. how quick a part reaches room temperature after being fused. For some others, for example, polypropylene, PP, this dependency on the cooling rate may be huge and controlling the cooling rate may be a possibility to have repeatability within the entire build chamber.

As the cooling rate is one possibility to determine the final shrinkage of a printed 3D object, it may be crucial to have similar cooling rates in the build chamber. Due to thermal losses, e.g. on top or side regions of the printable volume of the build chamber, the dimensional accuracy of printed 3D objects may suffer.

According to one example, a suitable fusing agent may be a printing liquid, e.g. an ink-type, formulation comprising carbon black, such as, for example, the fusing agent formulation commercially known as V1Q60A "HP fusing agent" available from HP Inc. In one example, such a fusing agent may additionally comprise an infra-red light absorber. In one example, such an ink may additionally comprise a near infra-red light absorber. In one example, such a fusing agent may additionally comprise a visible light absorber. In one example, such an ink may additionally comprise a UV light absorber. Examples of inks comprising visible light enhancers are dye based colored inks and pigment based colored inks, such as inks commercially known as CE039A and CE042A available from HP Inc. According to one example, a suitable detailing agent may be a formulation commercially known as V1Q61A "HP detailing agent" available from HP Inc. According to one example, a suitable build material may be PA12 build material commercially known as V1R10A "HP PA12" available from HP Inc.

In an attempt to compensate the geometric transformation, it may be recommendable to influence the cooling rates of the objects to be printed. However, the geometric transformation of the objects may not be equal for all objects in the build chamber of the 3D printing system due to thermal non-uniformities across the build chamber of the 3D printing system. To overcome this, the geometric transformation may be compensated by modeling and printing a shield to shield the printed objects.

To this end, the 3D printer or an apparatus associated with the 3D printer may have a shaping file which models a shield in dependence of the thermal behavior of the objects across the build chamber and/or in dependence of the thermal behavior of the build chamber. The shaping file includes a model or different models for different shields.

Examples of the present disclosure provide an apparatus to create 3D print data including data defining one or more objects to be printed and a shield to shield the one or more objects to be printed in the build chamber of a 3D printer, wherein the apparatus may be a component of a 3D printing system. The apparatus comprises a processor and a machine-readable storage medium storing machine-readable instructions executable by the processor. The machine-readable instructions comprise instructions to cause the processor to create 3D print data including data defining one or more objects to be printed in a build chamber of the 3D printer and data defining, in addition to the one or more objects, a shield to be printed to shield the one or more printed objects in the build chamber to reduce heat dissipation to an outside of the build chamber. The shield is designed depending on a thermal behavior of the build chamber and/or depending on a thermal behavior of the one or more objects to be printed. Printing the one or more objects and in addition the shield comprises printing the one or more objects and the shield during the same build process. The shield may be printed in a determined region of the build chamber, wherein the determined region may be one of plural regions the build chamber is divided into. The dividing into the plural regions may be performed due to a geometry of the objects to be printed. The term geometry of the objects may comprise delicate and/or robust portions of the objects. The shield may be printed in one or more of the plural regions. Each of the plural regions in which a shield or portion of a shield is printed is a determined region. Where to print a shield may change from one print job to another. Printing the one or more objects and the shield in the same build chamber permits printing the user objects and shield within the same print job and, therefore, expenditure of reducing thermal losses in performing the build process may be saved.

Figure 2:
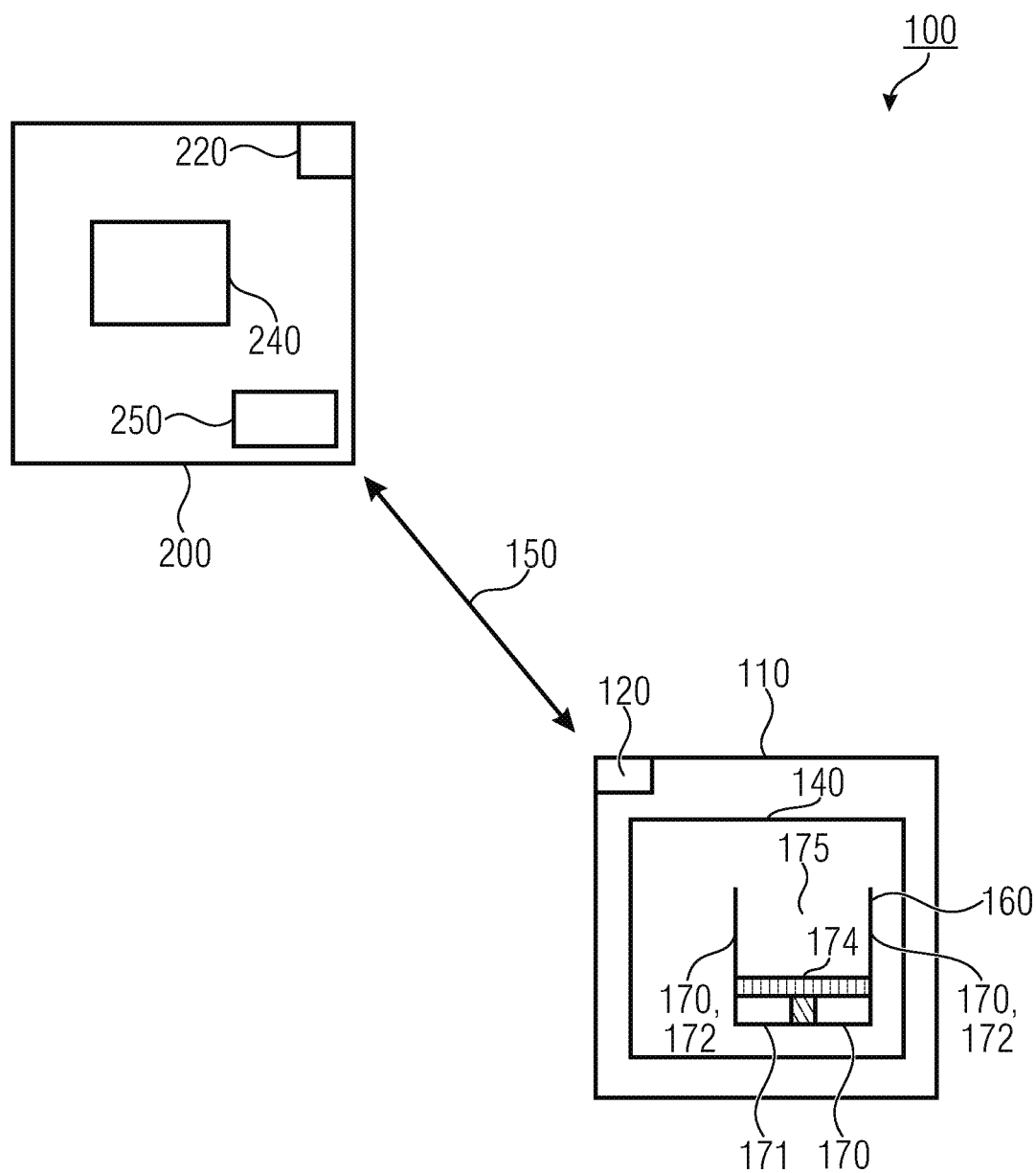
FIG. 2 is a simplified illustration of an apparatus being communicatively coupled with a 3D printer according to one example.

Referring now to FIG. 2, there is shown a simplified illustration of a 3D printing system 100 according to an example. The 3D printing system 100 comprises a 3D printer 110, an interface 120 of the 3D printer 110, a 3D printing machine 140, an apparatus 200 and an interface 220 of the apparatus 200 to create 3D print data for printing 3D objects and a shield in a build chamber as just described. The apparatus 200 comprises a processor 240 and a storage medium 250. As indicated by a bidirectional arrow 150, the apparatus 200 may be coupled to or connected with the 3D printer 110 to communicate with the 3D printer 110. Coupling 150 may be achieved by wired coupling or wireless coupling. The apparatus 200 may send 3D print data to the 3D printer 110 via coupling 150. The 3D printer 110 may comprise the 3D printing machine 140, which preforms instruction according to received 3D print data. The 3D print data may describe an arrangement of one or more objects to be printed and a shield to be printed in the build chamber of the 3D printing machine 140. Upon sending the 3D print data to the 3D printing machine 140 of the 3D printer 110, the one or more objects and the shield are printed during execution of one and the same print job. Stated differently, the 3D objects and the shield to shield the 3D objects are printed during the same build process. Thus, the dimensional accuracy with respect to the shrinkage of the printed objects may be improved during printing, i.e. during printing of 3D objects and the shield.

In examples, the machine-readable instructions stored in the storing medium 250 comprise instructions to cause the processor to model the thermal behavior of the build chamber including the one or more objects to be printed and to design the shield using the model of the thermal behavior. Considering the one or more objects to be printed for designing the shield includes considering the shape and/or the size of the objects to be printed, as well as the position in the build chamber where a specific object is to be printed. Each designed model of a shield may be saved in the storage medium 250 to be ready for delivery on demand for a future built process. Also, different models to model the shield may be stored. The different models may consider different aspects with regard to the thermal losses. By designing the shield to be printed for each print job to be executed the reduction of thermal losses may be improved because the geometry of the objects to be printed may be considered when modeling the shield.

In examples, the 3D print data are to cause the 3D printer to print the shield under the same conditions as the one or more objects to be printed. Because the shield is printed together with the objects to be printed during the same build process the shield is printed layer by layer as the objects to be printed. The shield undergoes a cooling process as the 3D objects do. However, because the shield is printed to shield the printed 3D objects, the shield is printed to form an outside of the 3D objects inside the build chamber. Thereby, the thermal losses of the 3D objects may be reduced because the thermal losses to the outside of a 3D object may be captured by the shield.

In examples, the 3D print data are to cause the 3D printer to print the shield outside a region of the build chamber dedicated for the one or more objects to be printed. Most of the area of the build chamber may be dedicated to print 3D objects. For example, the shield may be printed at an open side 175 of the build chamber 160. The area below the shield may be dedicated to the 3D object to be printed during a built process. Thus, the shield may be, for example, a top cover of the open side 175 of the build chamber 160. In this particular example an amount of 3D objects is printed, firstly, without printing a layer of the shield and then, at the end of the built process, the 3D object together with the shield is printed layer after layer. The shield may also be a side shield or a base shield.

Figure 3:
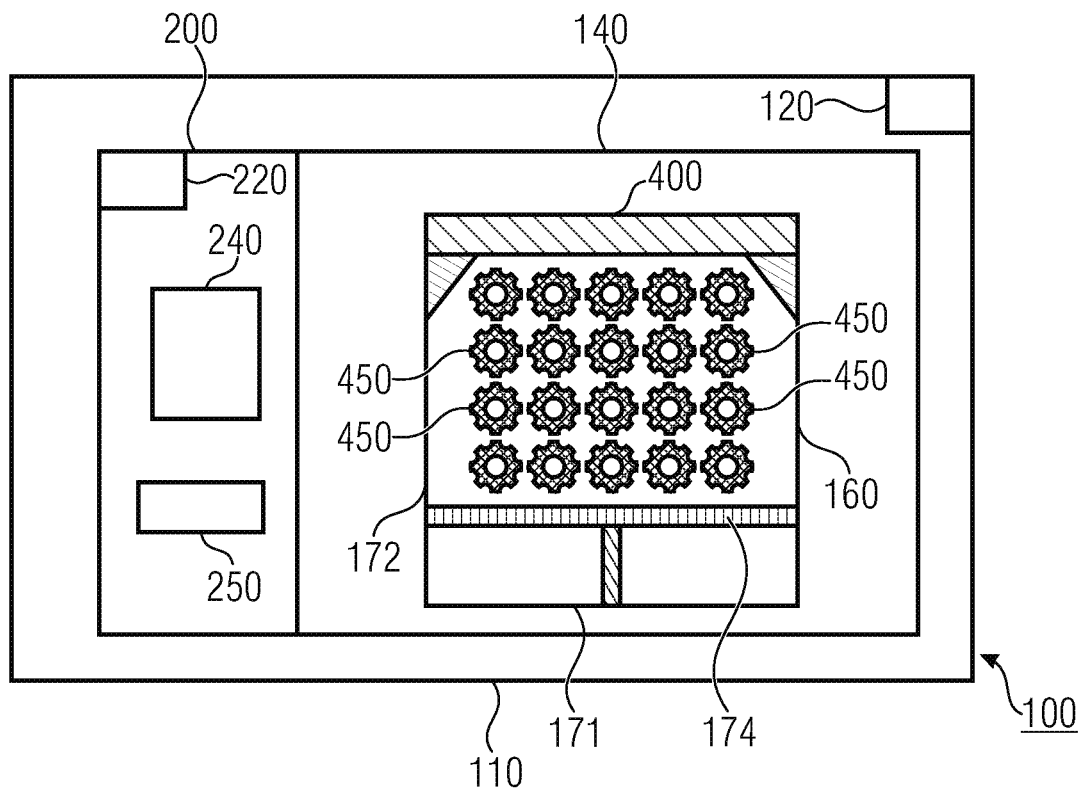
FIG. 3 is a simplified illustration of a 3D printer and an apparatus according to one example.

In examples, the apparatus comprises an interface to send the 3D print data to the 3D printer. In examples, apparatus 200 may be separate from the 3D printing machine 140 as for example shown in FIG. 2 and may be formed by a computer, such as a desktop computer, a laptop, a tablet or a personal digital assistant, wherein the interface 220 may be formed by any suitable interface associated with the computer. In other examples, apparatus 200 may be part of a web-based printing system, in which the 3D printer 110 may communicate with the apparatus via a web service. In other examples, the apparatus 200 is comprised in a 3D printer 110 as shown in FIG. 3. The 3D printer may comprise an interface 120 which may be used to communicate with an external device such a desktop computer, a laptop, a tablet or a personal digital assistant. In this case a user may control the apparatus inside the 3D printer via the external device. In examples, the interface 120 may be a display combined with a touchscreen to permit a user to let the apparatus create a print data.

The 3D printer 110 shown in FIG. 3 comprises the apparatus 200 as just described. As shown in FIG. 3, the 3D printer has executed a built process in which 3D object 450 are printed together with the shield 400. The shield 400, in this example, is formed as a top cover at the open side of the build chamber 160. During execution of the build process the base plate 174 may move from the open side toward the base wall 171 and thereby printing one layer of the objects 450 and or the shield after the other.

Figure 4:
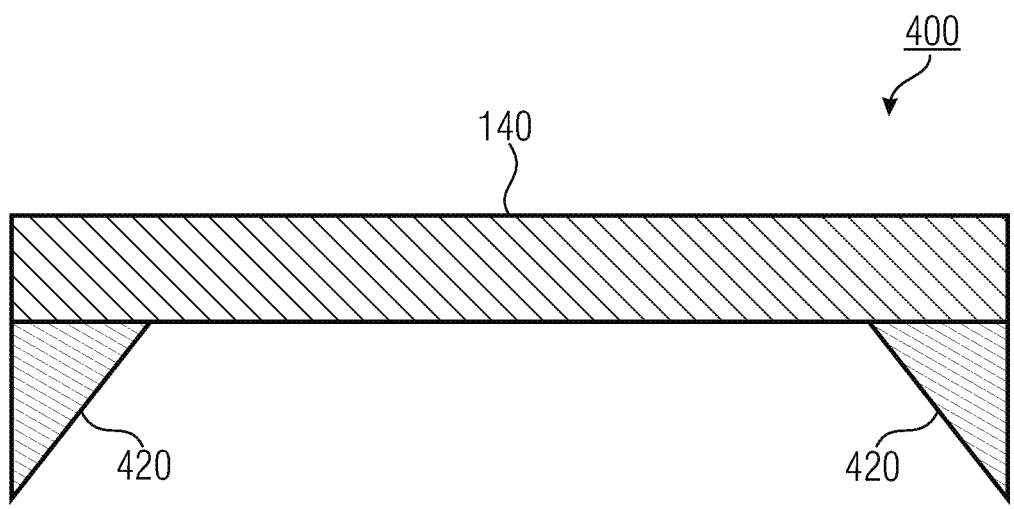
FIG. 4 is an enlarged illustration representing a printed shield according to an example.

In examples, the data defining the shield are to cause the 3D printer to print the shield comprising a first portion extending in parallel to a side of the build chamber and second portions extending from the first portion, wherein a thermal isolation provided by the second portions increases towards the first portion, wherein the side of the build chamber is a sidewall or an open side of the build chamber. A zoom of a top cover as already presented in FIG. 3 is shown in FIG. 4. The second portions 420 have a triangular cross-sectional shape and the first portion 410 has a quadrangular cross-sectional shape. Other geometries of the shield 400 which reduce heat dissipation may also be printed. The shape of the shield 400 is not limited to the example as shown in the Figures.

In examples, the increasing thermal isolation towards the first portion 410 is achieved by an increasing thickness of the second portions 420, a changing contone level of the second portions 420 and/or a changing structure of the second portions 420. As shown in FIG. 4, the second portions 420 are printed to have a tapered shape resulting in a triangular cross-sectional shape of the second portions 410. Other shapes are also possible to print. Other shapes of the shield 400 may be favorable depending on the thermal losses associated with the geometry of the 3D objects to be printed. Depending on the shape of the shield, the thermal isolation of the shield may be adapted to the thermal losses of the 3D objects in the build chamber. The thermal isolation may also be adapted by a changing the contone level of the second portions 420. The term contone is short for continuous tone. Changing the contone level means to change printing at different colors and different shades of lightness and darkness. Changing the contone level comprises changing the composition of the powder material being relevant for the resulting color tone perceived by a human eye.

In examples, the data defining the shield are to cause the 3D printer to print the shield at the open side to provide a thermal isolation adapted to the thermal isolation provided by the sidewalls and/or to print the shield at one or more sidewalls to increase the thermal isolation provided by the sidewalls. By printing the shield at the open side 175 to form a top cover a thermal isolation may be achieved which may be similar to a thermal isolation of the base wall 171 and/or of the sidewalls 174 of the build chamber. The shield printed as a top cover may assist the 3D objects to all have a similar cooling rate. Thus, all 3D object in the built chamber may have a similar shrinkage which improves the accuracy of each 3D object compared to another 3D object printed at a different position in the build chamber. Thermal losses may be recorded by a temperature camera inside the 3D printer. For example, the thermal camera may be attached to a print head. If for example thermal losses are recoded at the sidewalls of the build chamber, a shield associated with the side walls may be printed to adapt the thermal isolation.

In examples, the data defining the shield are to cause the 3D printer to print a top shield, a base shield or a side shield. A shield may be printed where a correction of thermal losses in the build chamber is demanded. This comprises that one or more shields may be printed in different regions of the build chamber. The one or more shield may have a different size and/or a different shape. The shape of the shield or shield may depend on the thermal losses which are demanded to be compensated. This means that the detected thermal losses of the build chamber as such and the thermal losses of the 3D objects to be printed are considered to model the design of the one or more shields.

The 3D printing machine 140 is to perform the print job according to the received 3D print data and comprises the components to build the objects, i.e., user objects and/or the shield, using the respective build material and/or printing fluids from which the objects are to be formed. The 3D printing machine 140 receives the 3D print data from the apparatus 200 and prints the 3D objects according to the arrangement of user objects and shield indicated in the 3D print job data. The 3D printing machine 140 comprises a build chamber 160 to print the one or more objects and the shield. The printing chamber comprises plural sides 170, wherein one side 170 may be the base wall 171 and other sides may be sidewalls 172. Another side may be the top wall or may be the open side 175. The build chamber 160 may comprise a build plate 174 having a rod 176 which may be movably mounted so that the build plate 174 may be moved during printing. During printing the build plate 174 may be moved towards the base wall. The build plate 174 is used to deposit the printed one or more objects and the shield in a volume of the build chamber 160.

In examples, the 3D printing system 100 may be in the form of a 3D printer 110, in which the apparatus 200 is integral with the 3D printing machine 140 as shown in FIG. 3. In examples, the 3D printer may comprise an interface 120 to merely receive data defining the one or more objects to be printed. Stated differently, the interface 120 of the 3D printer may receive the data defining the one or more objects to be printed without receiving data defining the shield. The data defining the one or more objects may be received from an external preprocessing application. The preprocessing application may implement machine readable instructions of an external device which may be temporarily communicatively coupled with the 3D printer. In other examples, apparatus 200 may be separate from the 3D printer 110 as shown in FIG. 2 and may be formed by a computer, such as a desktop computer, a laptop, a tablet or a personal digital assistant wherein the interfaces 120, 220 may be formed by any suitable interface associated with the computer. In other examples, apparatus 200 may be part of a web-based printing system, in which a user may communicate with the apparatus via a web service.

In examples, an initial shield modeling may be performed at installation of the 3D printer by printing a shield in the build chamber. In order to maintain the accuracy of the designed shield over time, the 3D printer is allowed to detect thermal losses in the build chamber during each or during selected print processes. In order to ensure that the shield design is improved from executing one print job after the other, the data of the measured thermal losses may be used as an input for subsequent shield designs. After a certain number of completed print jobs, the design of the shield may be modeled such that thermal losses converge to zero.

Examples of the present disclosure provide a method to print one or more objects and a shield to shield the printed one or more objects, wherein the shield and the one or more objects are printed in the same build process due to the instructions of 3D print data. In examples, upon receiving 3D print data including data defining one or more objects to be printed and receiving data to print a shield to shield the one or more objects a 3D printer starts to print the one or more objects and the shield in an associated build chamber. In other examples, upon receiving 3D print data including data defining one or more objects to be printed the 3D printer is adding data to print a shield to shield the one or more objects before the 3D printer starts to print the one or more objects and the shield in the associated build chamber. In these examples, the shield is designed depending on a thermal behavior of the build chamber and/or depending on a thermal behavior of the one or more objects to be printed.

The shield is printed to reduce heat dissipation to an outside of the build chamber. Stated differently, the shield is printed to let different cooling rates in the build chamber to approach each other. In other words, the different cooling rate inside the build chamber may be approximately homogenized. In doing so, the dimensional accuracy of the one or more objects to be printed is improved.

Figure 5:
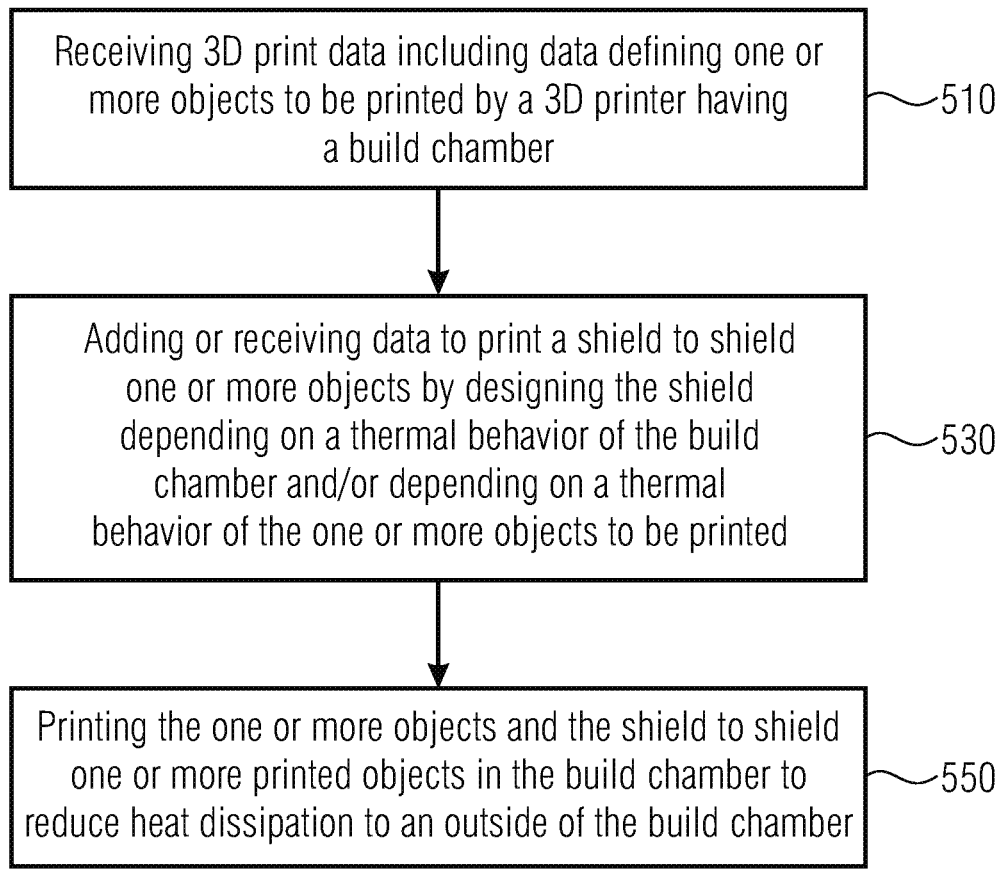
FIG. 5 is a flow diagram outlining a method of operating an apparatus being communicatively coupled with a 3D printer according to examples.

FIG. 5 shows a flow diagram of an example of a method of operating a 3D printing system or a 3D printer. At 510 3D print data including data defining one or more objects to be printed are received by the 3D printer, wherein the 3D printer is having a build chamber. The build chamber of the 3D printer is located inside a printing machine of the 3D printer. The data defining the 3D objects to be printed may comprise instruction to print on object or to print plural objects in the build chamber. The object or the objects to be printed may have a robust or a delicate geometry. The objects may have a small or a large size relatively to the volume of the build chamber. The receiving of the 3D print data may be via an interface of the 3D printer.

At 530 data to print a shield are received or added. The shield may be designed depending on a thermal behavior of the build chamber and/or depending on a thermal behavior of the one or more objects to be printed. In examples, the shield may be designed together with the data defining one or more objects to be printed by the apparatus. The printer then receives the data defining one or more objects to be printed and data to print the shield from the apparatus. In other examples, the 3D printer receives data defining the one or more objects without receiving data to print the shield. The printer then adds data to print the shield after having designed the shield depending on a thermal behavior of the one or more objects to be printed. To design the shield temperature losses of the build chamber as well as temperature losses due to the geometry of the objects to be printed are considered to design a model of the shield. The temperature losses of the build chamber originate from the thermal conductivity characteristics of the sides of the build chamber. The thermal conductivity of each side of the build chamber may depend on a side's thickness or the material the side is made of. For example, the base plate may be made of a different material than the sidewalls and/or the base wall or the top wall. The base plate which is used to deposit the printed objects may have a different heat dissipation characteristics than for example the side of the build chamber. When modeling the shield these different heat dissipation characteristics may be considered.

At 550 the one or more objects and the shield to shield the one or more printed objects are printed in the build chamber of the 3D printer during the same build process. By printing the shield together with the one or more objects the heat dissipation to an outside of the build chamber is reduced. Stated differently, the cooling rate is slowed down, i.e. the one or more objects may entirely cool down more slowly.

The printed shield may assist to reduce the heat dissipation because the printed shield acts as a heat reservoir. During printing the cover and the one or more objects to be printed are merely in contact via the powder of the build material used for printing. Thereby the thermal conductivity is similar.

Figure 6:
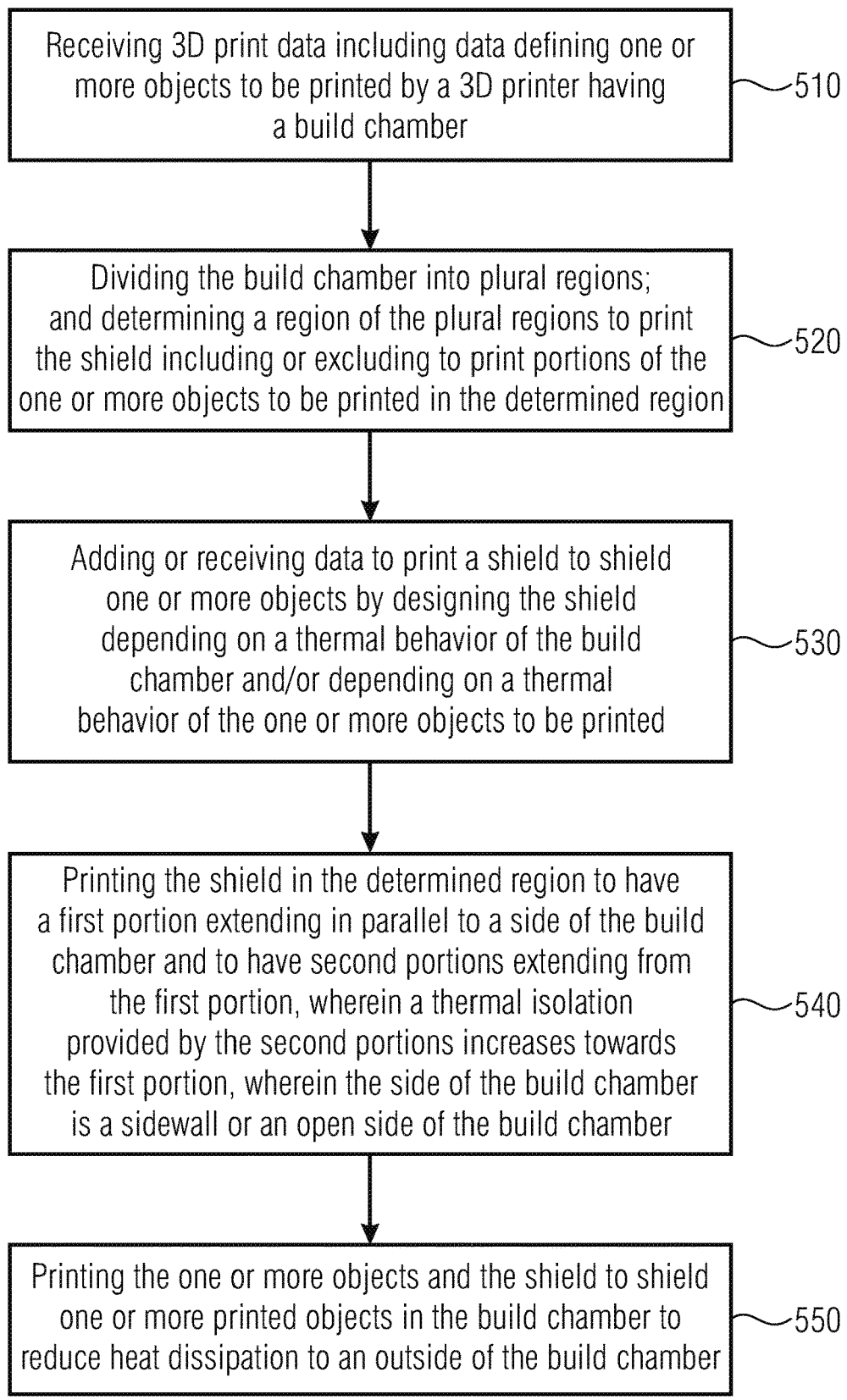
FIG. 6 is a flow diagram outlining a method of operating an apparatus being communicatively coupled with a 3D printer according to examples.

FIG. 6 shows a flow diagram of an example of a method of operating a 3D printing system or a 3D printer. In addition to the method just described, an example of the method of operating a 3D printing system or a 3D printer may comprise at 520 dividing the build chamber into plural regions and determining a region of the plural regions to print the shield including or excluding to print portions of the one or more objects to be printed in the determined region. The build chamber may be divided into plural regions by considering the thermal losses which have been measured in prior print processes, e.g. by a heat camera associated with the build chamber of the printing machine. The process of providing the build chamber into plural regions may be performed by the apparatus which may comprise machine readable instructions to cause the processor to perform the dividing of the build chamber.

At 540 the shield is printed in the determined region to have a first portion extending in parallel to a side of the build chamber and to have second portions extending from the first portion, wherein a thermal isolation provided by the second portions increases towards the first portion, wherein the side of the build chamber is a sidewall or an open side of the build chamber. Depending on the geometry of the 3D objects to be printed, several regions of the plural regions may be referred to as determined regions. In each determined region a shield may be printed to shield a particular portion of a 3D object. For example, if a delicate object is to be printed, which has a complex structure, one or more shields in different determined regions may need to be printed.

In examples, the method may comprise the process of starting to print the shield in the determined region having an extension parallel to a side of the build chamber. The determined region may comprise plural layers of the shield and/or plural layers of the one or more objects to be printed. In the determined region the shield alone may be printed, or the shield may be printed together with portions of the one or more 3D objects. A first layer of the shield may have a different extension along the extension of the determined region than a subsequent shield layer, in particular the first layer of the shield may have a smaller extension along the extension of the determined region than the subsequent shield layer. With respect to FIG. 4 a shield having first and second portions may be printed, wherein the second portion may have a triangular cross-sectional shape. For example the last layer of the second portion may have an extension of about 5 mm. Furthermore, the thickness of the first portion may be 5 mm or more or less.

Figure 7:
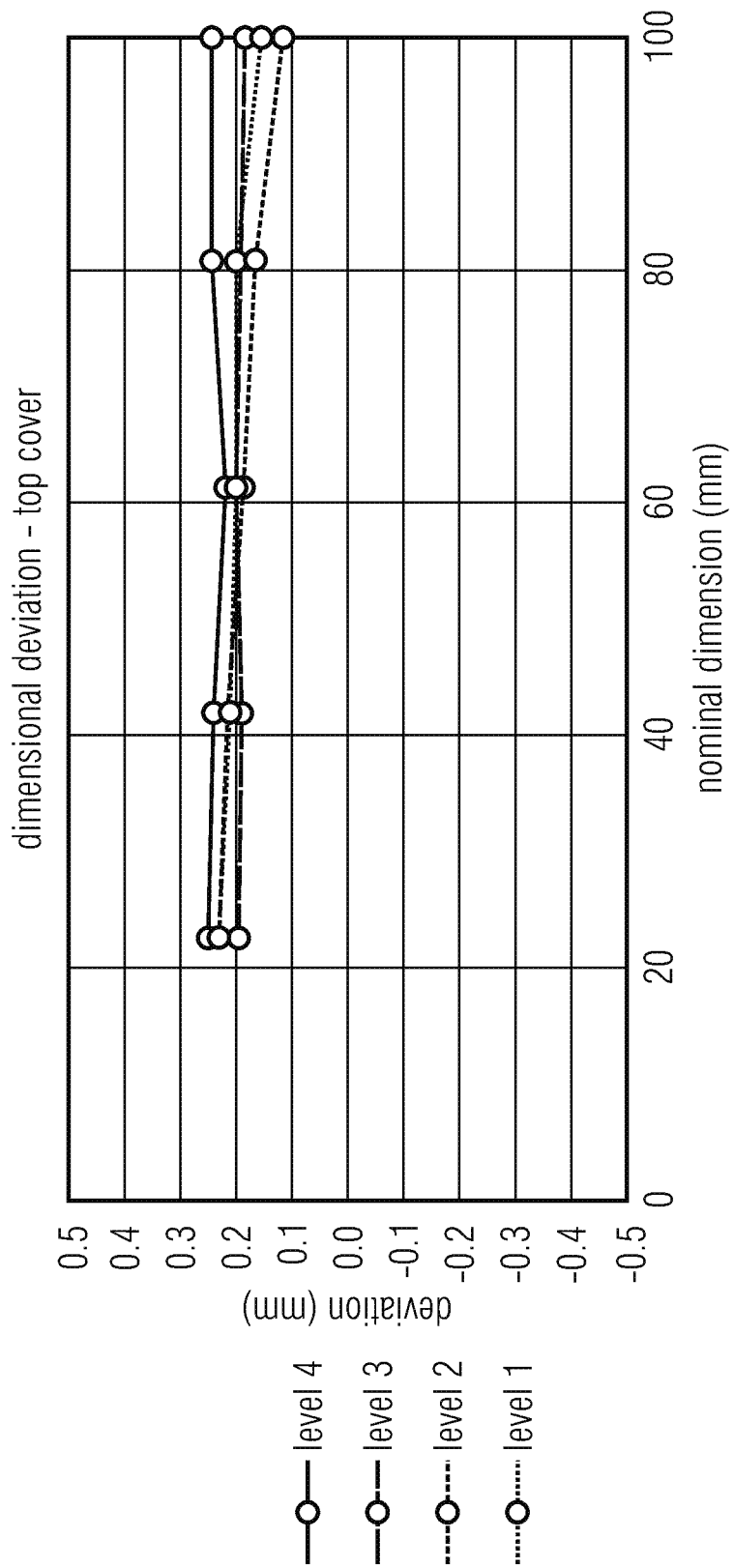
FIG. 7 is an illustration representing determined deviations as a function of nominal dimension of a printed object of a 3D printer according to an example.

FIG. 7 shows results of a dimensional deviation versus a nominal dimension when a shield in the form of a top cover is printed together with the 3D objects in the build chamber. As depicted in FIG. 7 there are shown four graphs, each graph is connecting measured points, wherein each set of points associated with the same graph represents the deviation measured at the corresponding nominal dimension in one of four regions the build chamber is divided into. Stated differently, to obtain four graphs, the build chamber is divided into four regions referred to as level L1, level L2, level L3 and level L4. The level L4 is the determined region in which the shield to shield the one or more objects is printed. In level L1 to level L3 no shield or portions of the shield is printed. In level L1 to level L3 the 3D objects are printed. A maximum dimensional deviation is reached in level L4 at a nominal dimension of 100 mm of level L4 and is found to be 0.25 mm, wherein the minimum dimensional deviation at a nominal dimension of 100 mm of level L1 is found to be 0.1 mm. At a nominal dimension of about 22 mm the deviation from level L1 to level L4 goes from 0.2 mm to 0.25 mm. At a smaller nominal dimension the measured deviation per each level is located closer together than at greater nominal dimensions of 100 mm.

Figure 8A:
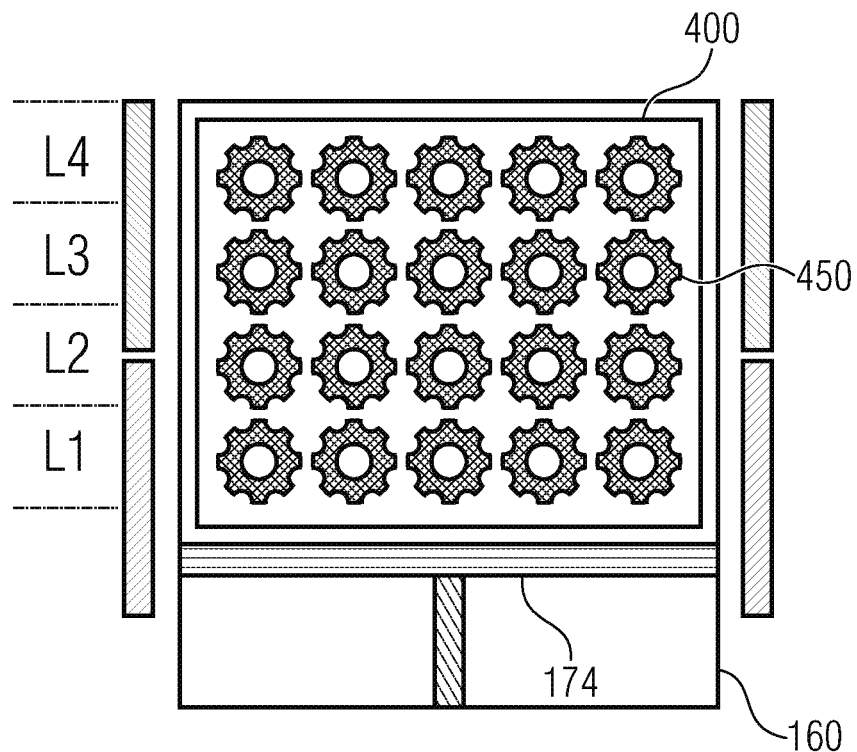
FIG. 8 is an illustration representing three scenarios with its corresponding determined dimensional deviations according to an example; wherein a full cage (FIG. 8*a*, 8*b*), no cage (FIG. 8*c*, 8*d*) and a shield (FIG. 8*e*, 8*f*) have been printed.
Figure 8B:
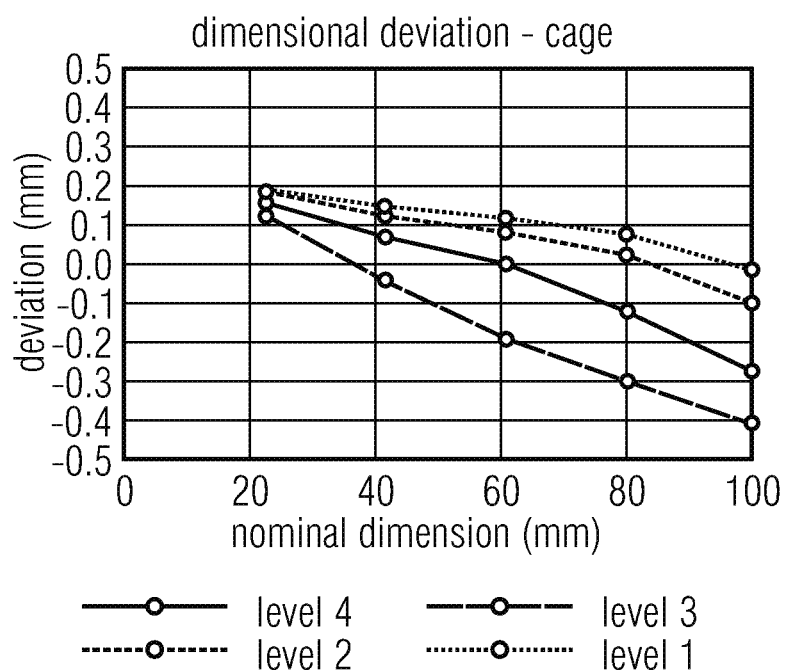
Figure 8C:
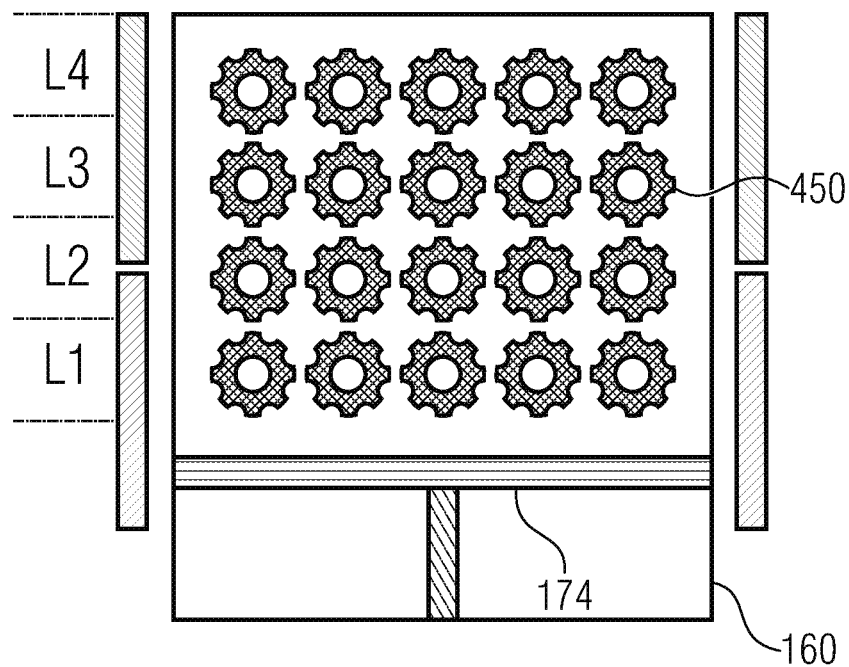
Figure 8D:
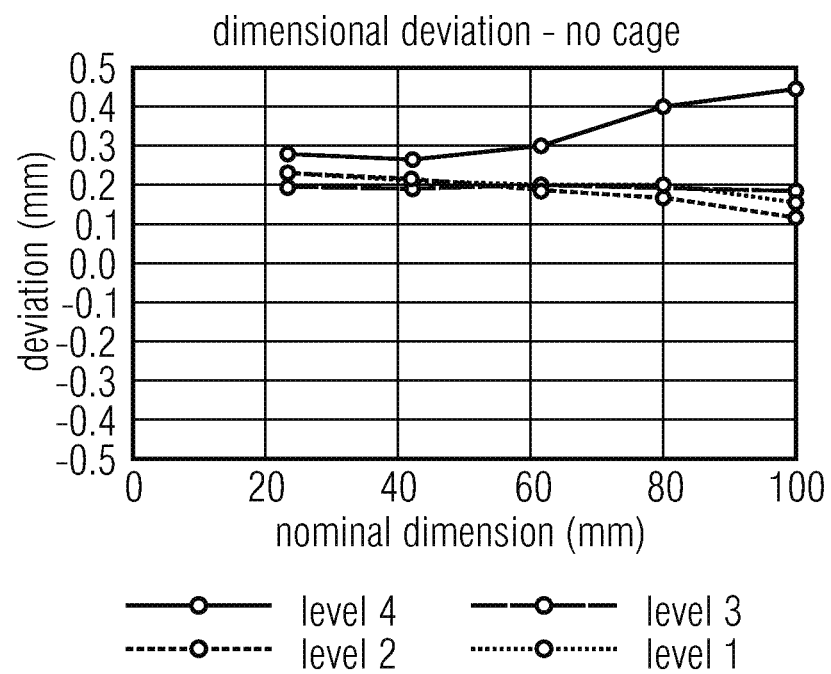
Figure 8E:
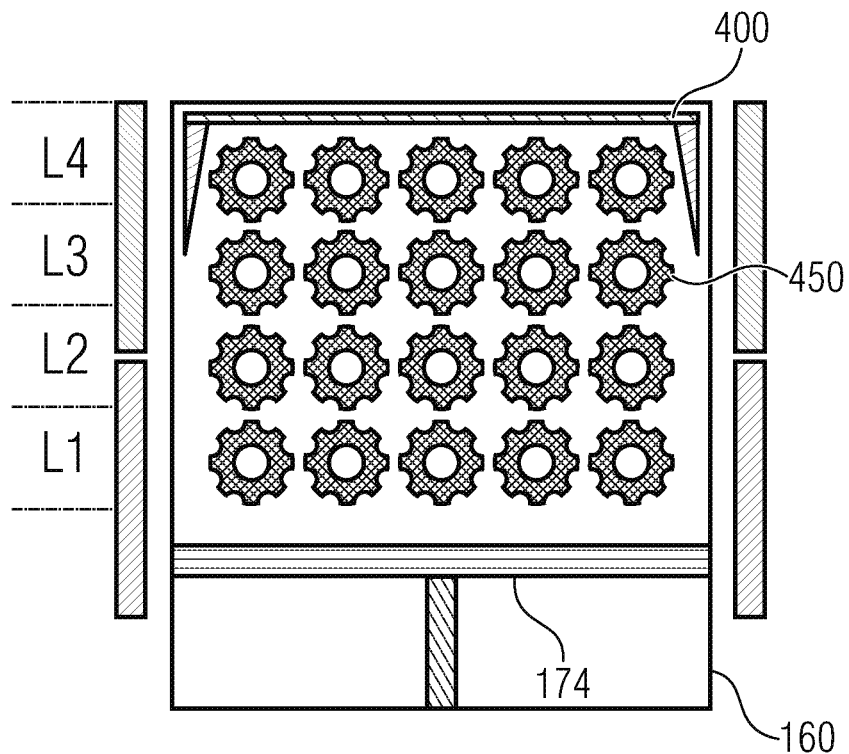
Figure 8F:
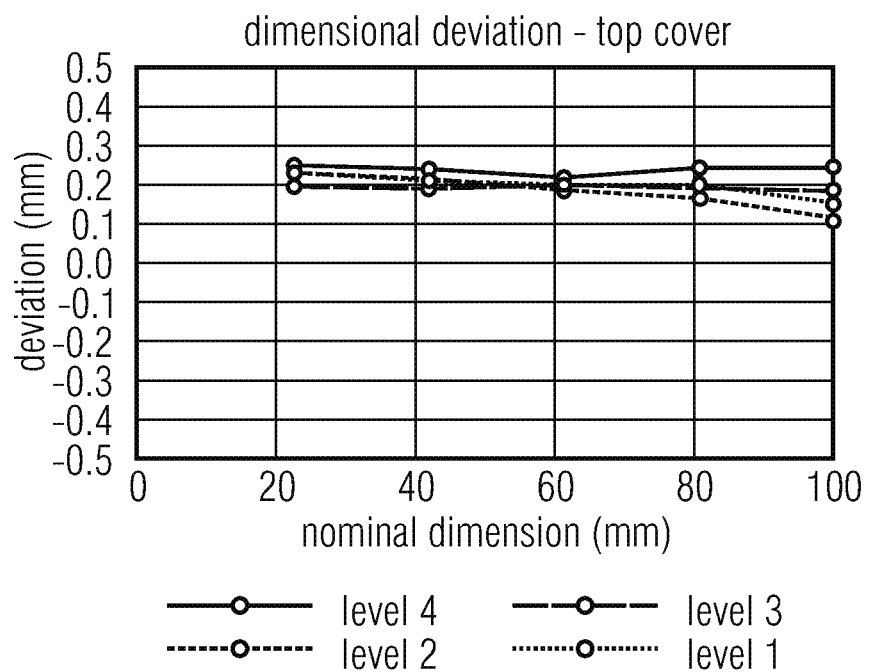

To gain inside of the meaning of a maximum dimensional deviation of for example 0.25 mm at a nominal dimension of 100 mm, FIGS. 8a) to 8f) show in synopsis a comparison of the results obtained when the same 3D objects 450 are printed in the build chamber 160 with a shield 400 in the form of a cage as shown in FIGS. 8a) and 8b), no cage as shown in FIGS. 8c) and 8d) and as top cover as shown in FIGS. 8e) and 8f) and FIG. 7. The build chamber shown in each of the FIGS. 8a), 8c) and 8e) is again divided into level L1, level L2, level L3 and level L4. When printing a full cage each of the level L1 to level L4 is a determined region because in each level L1 to level L4 a portion of the shield is printed. When printing no cage none of the level L1 to level L4 is a determined region. When printing the shield as a top over, the level L4 is the determined region where the shield is printed including and/or excluding portions of the 3D objects. Each of the graphs as shown in FIGS. 8b), 8d), and 8f) is shown with the corresponding printed shield printed in the build chamber 160 as shown in FIGS. 8a), 8c), and 8e). By comparing the graphs of each of the FIGS. 8b), 8d) and 8f) it may be recognized that the measured deviation is smallest when a shield is printed as a top cover. In FIG. 8f) the measured deviations in each level L1 to level L4 are found to lie closer together than in the graphs as shown in FIGS. 8b) and/or FIG. 8d). When printing no shield at all as shown in FIGS. 8c) and 8d), then the level L4 being the top region of the build chamber shows a greater deviation at, for example, a nominal dimension of 100 mm than all the other levels L1 to L3. When considering a full cage as shown in FIG. 8a) a negative resulting deviation may occur as shown in FIG. 8b). A negative deviation may result in 3D objects having low accuracy. In this case more variability of each of the levels L1 to L4 is introduced. Also by printing a full cage the build volume of the build chamber to print the 3D objects may be reduced. By comparing the case of no cage according to FIGS. 8c) and 8d) with the case of a shield in the form of a top cover according to FIGS. 8e) and 8f) it may be recognized that the deviation of the top region of level L4 is smaller when printing a shield 400 as when printing no shield. Thus, printing a shield 400 together with the 3D objects 450 improves the accuracy of each region of the build chamber. The position where a 3D object is printed in the build chamber becomes less crucial when regarding the dimensional accuracy of printed 3D objects when a shield is also printed. Dimensional repeatability is achieved throughout the entire build chamber for all printed 3D objects.

Introducing an shield which may be adapted to the geometry of the 3D objects to be printed may reduce a dimensional variability of the printed 3D objects. The cooling rates may be made independent of the position where a particular 3D object is printed in the build chamber. For example, printing a top shield reduces the heat dissipation of the 3D objects in a top region. An gain of the present disclosure may be considered to be an uniformization of thermal contractions in the build chamber. A further gain of printing a shield in the form of a top cover, for example, may be that the build volume to print the 3D objects in the build chamber is not reduced. Because the quality of the shield is not crucial, the shield may be printed outside the build volume of the build chamber dedicated to the 3D objects. The present disclosure is not restricted to a top cover, though the top cover is shown in examples. Thermal losses at any side may be managed by printing a shield at this corresponding side.

Examples described herein may be realized in the form of hardware, machine-readable instructions or a combination of hardware and machine-readable instructions. Any such machine-readable instructions may be stored in the form of volatile or non-volatile storage such as, for example, a storage device, such as a ROM, whether erasable or rewritable or not, or in the form of memory, such as, for example, RAM, memory chips, device or integrated circuits or an optically or magnetically readable medium, such as, for example, a CD, DVD, magnetic disk or magnetic tape. The above storage devices and storage media are examples of storage medium 130 and are examples of machine-readable storage, that are suitable for storing a program or programs that, when executed, implement examples described herein.

In examples, any hardware described herein, in particular the processor, may include circuitry in a controller, a microprocessor, or an application specific integrated circuit, ASIC, or may be implemented with discrete logic or components, or a combination of other types of analog or digital circuitry, combined on a single integrated circuit or distributed among multiple integrated circuits. A product, such as a computer program product, may include a storage medium and computer readable instructions stored on the medium, which when executed in a computer system, a printer or other device, cause the device to perform operations according to any of the description above.

The processing capability of the systems, devices, and circuitry described herein, including the processor 120 or any portion thereof, may be distributed among multiple system components, such as among multiple processors and memories, which may include multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and applications may be parts, such as subroutines of a single program, separate programs, distributed across several memories and processors, or implemented in many different ways, such as in a library, such as a shared library, such as a dynamic link library, DLL. The DLL, for example, may store code that performs any of the system processing described above. While various examples have been described above, many more implementations are possible.

All of the features disclosed in the specification including any accompanying claims, abstract and drawings, and/or all the features of any method or progress described may be combined in any combination including any claim combination, except combinations where at least some of such features are mutually exclusive. In addition, features disclosed in connection with a system may, at the same time, present features of a corresponding method, and vice versa.

Each feature disclosed in the specification including any accompanying claims, abstract and drawings may be replaced by other features serving the same, equivalent or a similar purpose, unless expressly stated otherwise. Thus, unless expressly stated otherwise, each feature disclosed is one example of a generic series of equivalent or similar features.

The foregoing has described the principles, examples and modes of operation. However, the teachings herein are not be construed as being limited to the particular examples described. The above-described examples are to be regarded as illustrative rather than restrictive, and it is to be appreciated that variations may be made in those examples by workers skilled in the art without departing from the scope of the following claims.

The invention claimed is:

1. An apparatus comprising:
a processor; and
a machine-readable storage medium storing machine-readable instructions executable by the processor to:

generate 3D print data including:
  data defining one or more objects to be printed in a build chamber of a 3D printer, the build chamber defined by a bottom surface and a plurality of sidewall surfaces, such that the build chamber has an open top side opposite the bottom surface; and
  data defining, in addition to the one or more objects, a shield to be printed to shield the one or more printed objects in the build chamber to reduce heat dissipation from the one or more printed objects to an outside of the build chamber, the shield having a design depending on either or both of a thermal behavior of the build chamber and a thermal behavior of the one or more objects to be printed; and
cause the 3D printer to print the one or more objects and the shield in the build chamber in accordance with the 3D print data,
wherein the shield comprises a portion between the open top side and where the one or more objects are to be printed in the build chamber, to reduce the heat dissipation from the one or more printed objects to the outside of the build chamber through the open top side.

2. The apparatus according to claim 1, wherein the machine-readable instructions are executable by the processor to further model the thermal behavior of the build chamber including the one or more objects to be printed and generate the design of the shield using the model of the thermal behavior.

3. The apparatus according to claim 1, wherein the 3D print data are to cause the 3D printer to print the shield under the same conditions as the one or more objects to be printed.

4. The apparatus according to claim 1, wherein the shield comprises a first portion extending in parallel to a side of the build chamber and second portions extending from the first portion, wherein a thermal isolation provided by the second portions increases towards the first portion, wherein the side of the build chamber is a sidewall or the open top side of the build chamber.

5. The apparatus according to claim 4, wherein the increasing thermal isolation towards the first portion is achieved by one or multiple of: an increasing thickness of the second portions, a changing contone level of the second portions, and a changing structure of the second portions.

6. The apparatus according to claim 5, wherein the data defining the shield are to cause the 3D printer either to print the shield at the open top side to provide a thermal isolation adapted to a thermal isolation provided by the sidewalls, or to print the shield at one or more sidewalls to increase the thermal isolation provided just by the sidewalls.

7. The apparatus according to claim 1, wherein the apparatus further comprises the 3D printer.

8. The apparatus according to claim 1, wherein the 3D printer is separate from the apparatus.

9. The apparatus according to claim 1, wherein the portion of the shield is along a plane parallel to the open top side.

10. The apparatus according to claim 9, wherein the data defining the shield is generated such that the one or more objects when printed in the build chamber are completely enclosed by the bottom surface and sidewall surfaces of the build chamber and by the portion of the shield.

11. The apparatus according to claim 9, wherein the portion of the shield extends along the plane such that the portion is adjacent to each sidewall surface of the build chamber.

12. The apparatus according to claim 9, wherein the portion is a first portion of the shield, and the shield further comprises second portions extending from the first portion at the sidewall surfaces of the build chamber with decreasing thickness.

13. A method comprising:
generating, by a processor, 3D print data including:
  data defining one or more objects to be printed in a build chamber of a 3D printer, the build chamber defined by a bottom surface and a plurality of sidewall surfaces, such that the build chamber has an open top side opposite the bottom surface; and
  data defining, in addition to the one or more objects, a shield to be printed to shield the one or more printed objects in the build chamber to reduce heat dissipation from the one or more printed objects to an outside of the build chamber, the shield having a design depending on either or both of a thermal behavior of the build chamber and a thermal behavior of the one or more objects to be printed; and
causing, by the processor, the 3D printer to print the one or more objects and the shield in the build chamber in accordance with the 3D print data,
wherein the shield comprises a portion between the open top side and where the one or more objects are to be printed in the build chamber, to reduce the heat dissipation from the one or more printed objects to the outside of the build chamber through the open top side.

14. The method according to claim 13, wherein the shield comprises a first portion extending in parallel to a side of the build chamber and second portions extending from the first portion, wherein a thermal isolation provided by the second portions increases towards the first portion, wherein the side of the build chamber is a sidewall or the open top side of the build chamber.

15. The method according to claim 13, wherein the portion of the shield is along a plane parallel to the open top side.

16. A non-transitory computer-readable data storage medium storing instructions executable by a processor to perform processing comprising:
generating 3D print data including:
  data defining one or more objects to be printed in a build chamber of a 3D printer, the build chamber defined by a bottom surface and a plurality of sidewall surfaces, such that the build chamber has an open top side opposite the bottom surface; and
  data defining, in addition to the one or more objects, a shield to be printed to shield the one or more printed objects in the build chamber to reduce heat dissipation from the one or more printed objects to an outside of the build chamber, the shield having a design depending on either or both of a thermal behavior of the build chamber and a thermal behavior of the one or more objects to be printed; and
causing the 3D printer to print the one or more objects and the shield in the build chamber in accordance with the 3D print data,
wherein the shield comprises a portion between the open top side and where the one or more objects are to be printed in the build chamber, to reduce the heat dissipation from the one or more printed objects to the outside of the build chamber through the open top side.

17. The non-transitory computer-readable data storage medium according to claim 16, wherein shield comprises a first portion extending in parallel to a side of the build chamber and second portions extending from the first portion, wherein a thermal isolation provided by the second portions increases towards the first portion, wherein the side of the build chamber is a sidewall or the open top side of the build chamber.

18. The non-transitory computer-readable data storage medium according to claim 16, wherein the portion of the shield is along a plane parallel to the open top side.

* * * * *